United States Patent [19]
Upham, III

[11] Patent Number: 5,984,774
[45] Date of Patent: Nov. 16, 1999

[54] AIR DISTRIBUTION UNIT AND SYSTEM

[76] Inventor: Stephen P. Upham, III, 5 Cambridge St., Saratoga Springs, N.Y. 12866

[21] Appl. No.: 09/041,354

[22] Filed: Mar. 12, 1998

[51] Int. Cl.$^6$ ...................................................... B60H 1/26
[52] U.S. Cl. ............................................ 454/144; 454/284
[58] Field of Search .............................. 62/244; 454/118, 454/137, 144, 284, 306

[56] References Cited

U.S. PATENT DOCUMENTS

| | | |
|---|---|---|
| 2,557,004 | 6/1951 | Lepper . |
| 2,882,809 | 4/1959 | Nelson ..................................... 454/144 |
| 3,550,522 | 12/1970 | Bauer et al. ............................. 454/144 |
| 3,916,639 | 11/1975 | Atkinson .............................. 62/244 X |
| 4,343,230 | 8/1982 | Lundstrom . |
| 4,512,239 | 4/1985 | Watanabe et al. ....................... 454/144 |
| 4,807,523 | 2/1989 | Radtke et al. ........................... 454/137 |
| 5,052,283 | 10/1991 | Altus ....................................... 454/144 |
| 5,165,646 | 11/1992 | Gewecke ............................... 62/244 X |
| 5,307,645 | 5/1994 | Pannell ...................................... 62/244 |

FOREIGN PATENT DOCUMENTS

| | | |
|---|---|---|
| 25 08 955 | 9/1976 | Germany . |
| 59-32513 | 2/1984 | Japan ..................................... 454/144 |
| 2 208 542 | 5/1989 | United Kingdom . |

*Primary Examiner*—Harold Joyce
*Attorney, Agent, or Firm*—Heslin & Rothenberg, P.C.

[57] ABSTRACT

A portable self-contained air distribution unit, and system incorporating same, are useful in assisting in the distribution of air within a vehicle. The unit comprises an elongate conduit having an inlet, an outlet and a top portion spaced from a bottom portion. A chamber is within the elongate conduit in airflow communication with the inlet and the outlet. A front flap is joined to the inlet of the conduit. The front flap is moveable between an open position and a retracted position and when the front flap is in the open position air flows into the inlet through the chamber and exits the at least one outlet. Various additional features may be combined as desired.

20 Claims, 5 Drawing Sheets

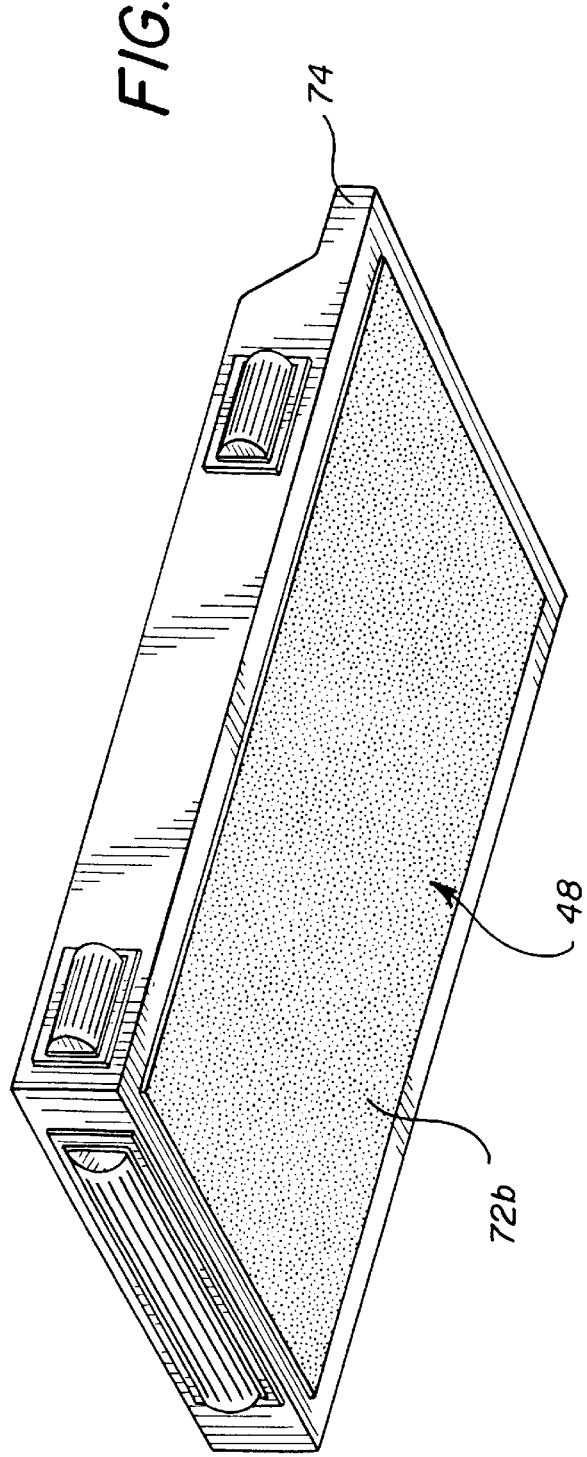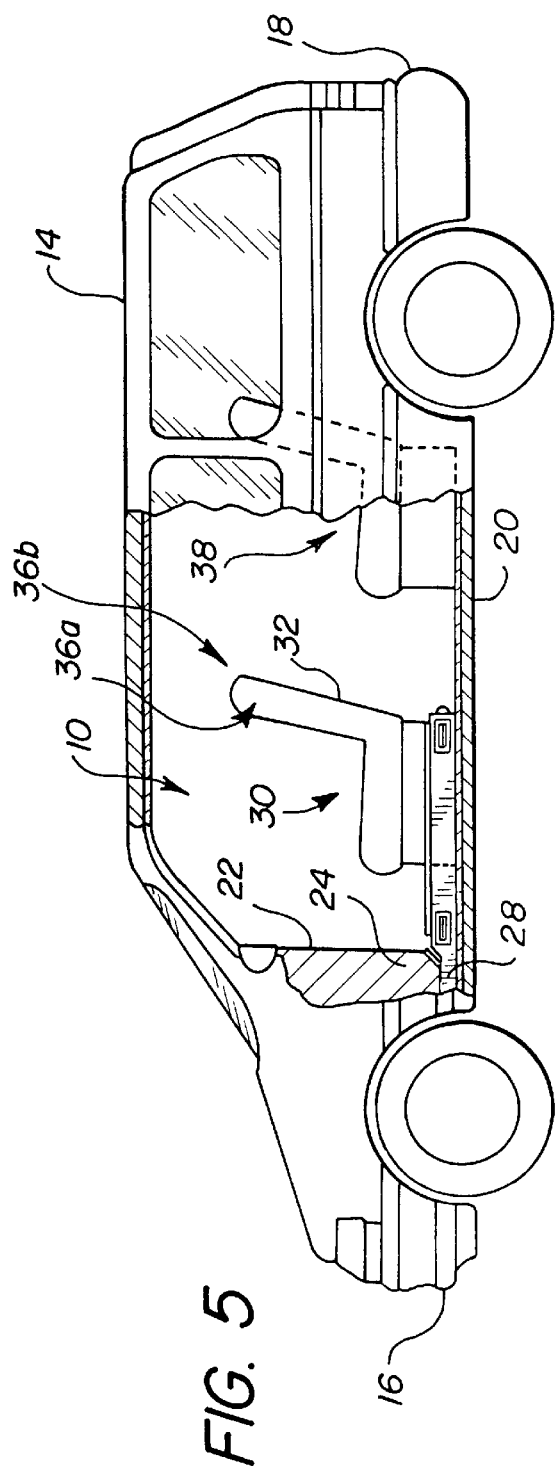

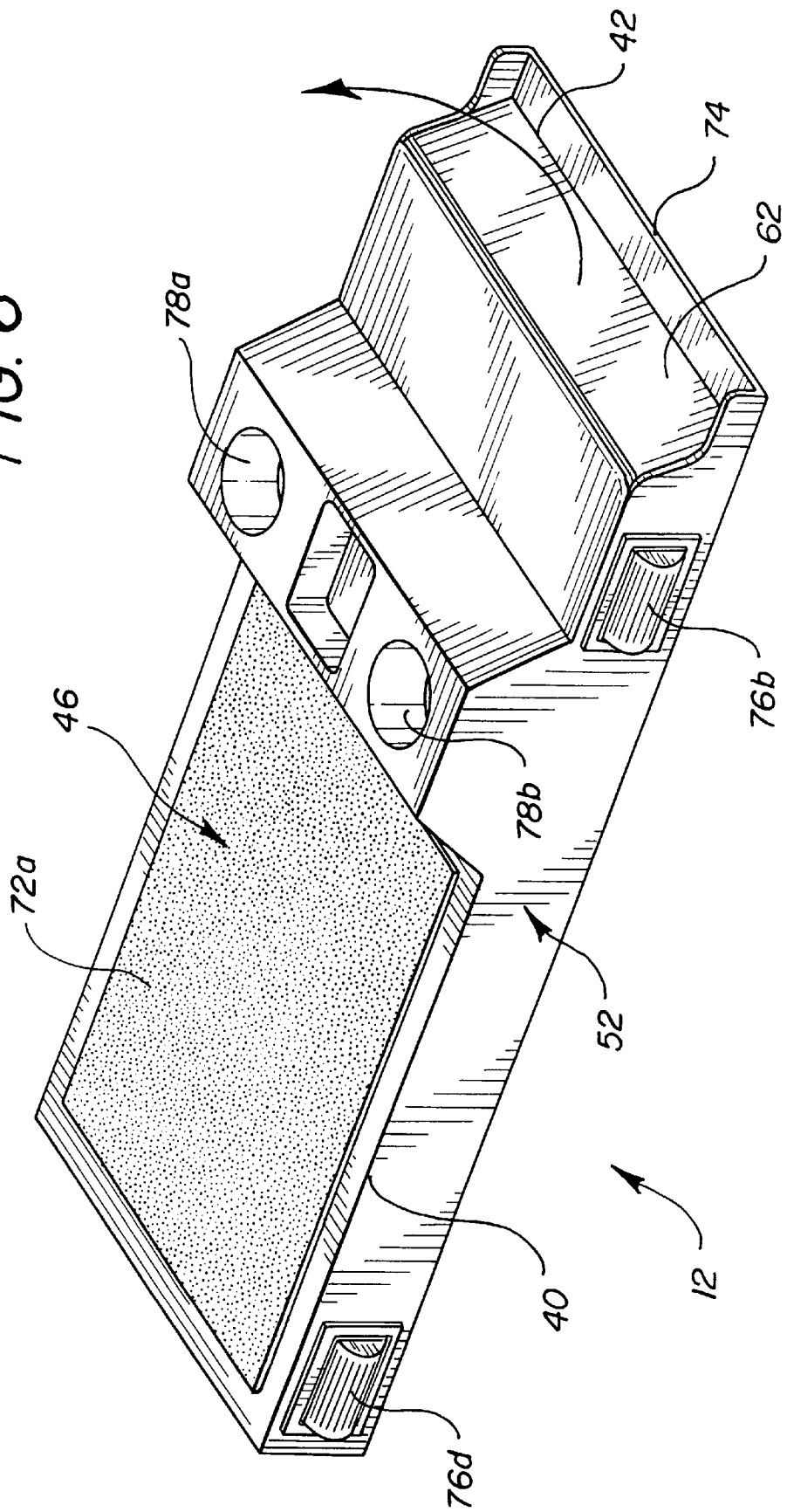

AIR DISTRIBUTION UNIT AND SYSTEM

FIELD OF THE INVENTION

This invention relates generally to a device for use in assisting in the distribution of temperature treated air. In particular the invention concerns a portable, self-contained air distribution unit that easily retrofits to a vehicle's existing air distribution system for assisting in the distribution of a uniform flow of treated air to front and rear passenger compartments.

BACKGROUND OF THE INVENTION

Various air distribution devices exist in the art for assisting a vehicle's air distribution system in distributing air to compartments in the vehicle. However, these devices have several drawbacks, including: they often comprise multiple components that must remain interconnected in order to operate properly; they are rigidly attached to the existing vehicle air distribution system; they have limited application due to their structural configurations; they address limited needs; and/or, they are often prevented from operating in their ordinary intended environment. Accordingly, an air distribution unit and system is needed which overcomes these drawbacks and can provide other features as desired.

The vehicle air distribution devices disclosed in the prior art do not offer the flexibility and inventive features of my air distribution unit and system. As will be described in greater detail hereinafter, the features of the present invention differs from those previously proposed and overcome the drawbacks of those devices.

SUMMARY OF THE INVENTION

According to the present invention I have provided a portable self-contained air distribution unit, and system incorporating same, for use in assisting in the distribution of air within a vehicle. The unit comprises an elongate conduit having an inlet, at least one outlet located remote from the inlet and a top portion spaced from a bottom portion. A chamber is within the conduit in airflow communication with the inlet and the at least one outlet. A front flap is joined at least proximate the inlet of the conduit. The front flap is moveable between an open position and a retracted position and when the flap is in the open position air flows into the inlet through the chamber and exits the at least one outlet thereby enabling the air distribution unit to assist in the distribution of air within the vehicle.

Other features of the invention relate to support and flow control structures located within the unit to assist in distributing air into and out of the unit and/or assist in maintaining the structural integrity and configuration of the unit.

Still other features of the invention concern a front lip portion, vent directional member(s) and a non-skid surface, all preferably external structures, for assisting in directing the flow of air into and out of the unit while maintaining a position of the unit, as desired, without rigidly connecting the unit to the vehicle, altering existing vehicle structure(s) or modifying the unit when operating in its ordinary intended environment (e.g. in a vehicle filled with adults and kids).

In accordance with the following, it is an advantage of the present invention to provide a simple unitary construction that can be retrofit to existing vehicle air distribution systems without making any modifications to the air distribution system or the vehicle's air treatment unit.

A further advantage is to maximize air flow with a minimal height of the air distribution unit to enable space conservation within the passenger compartment while also avoiding unwanted back pressure in the air distribution system.

Yet a further advantage is to provide a sturdy load-bearing construction that enables ingress and egress between front seats of the vehicle and where a person, namely a child, or other object can be placed on top of the unit without inhibiting use of the unit or system.

Still a further advantage is to provide a front flap which is moveable up and down to enable access to an inner compartment of a front instrument panel of the vehicle with minimal restriction on use of the unit and system and without requiring repositioning of the unit in order to access the inner compartment.

DESCRIPTION OF THE DRAWINGS

Other features and advantages of the invention will become more readily apparent upon reference to the following description when taken in conjunction with the accompanying drawings, which drawings illustrate several embodiments of the invention.

FIG. 4 is a perspective bottom view of the air distribution unit of FIG. 1.

FIG. 5 is a partially cut-away side view of the air distribution of FIG. 1, here positioned adjacent a vehicle air treatment outlet, in air flow communication therewith, and comprising part of a vehicle air distribution system.

FIG. 6 is a perspective top view of an alternative embodiment of an air distribution unit, in accordance with the features of the invention.

DETAILED DESCRIPTION OF THE PREFERRED EMBODIMENTS

Figure 1:
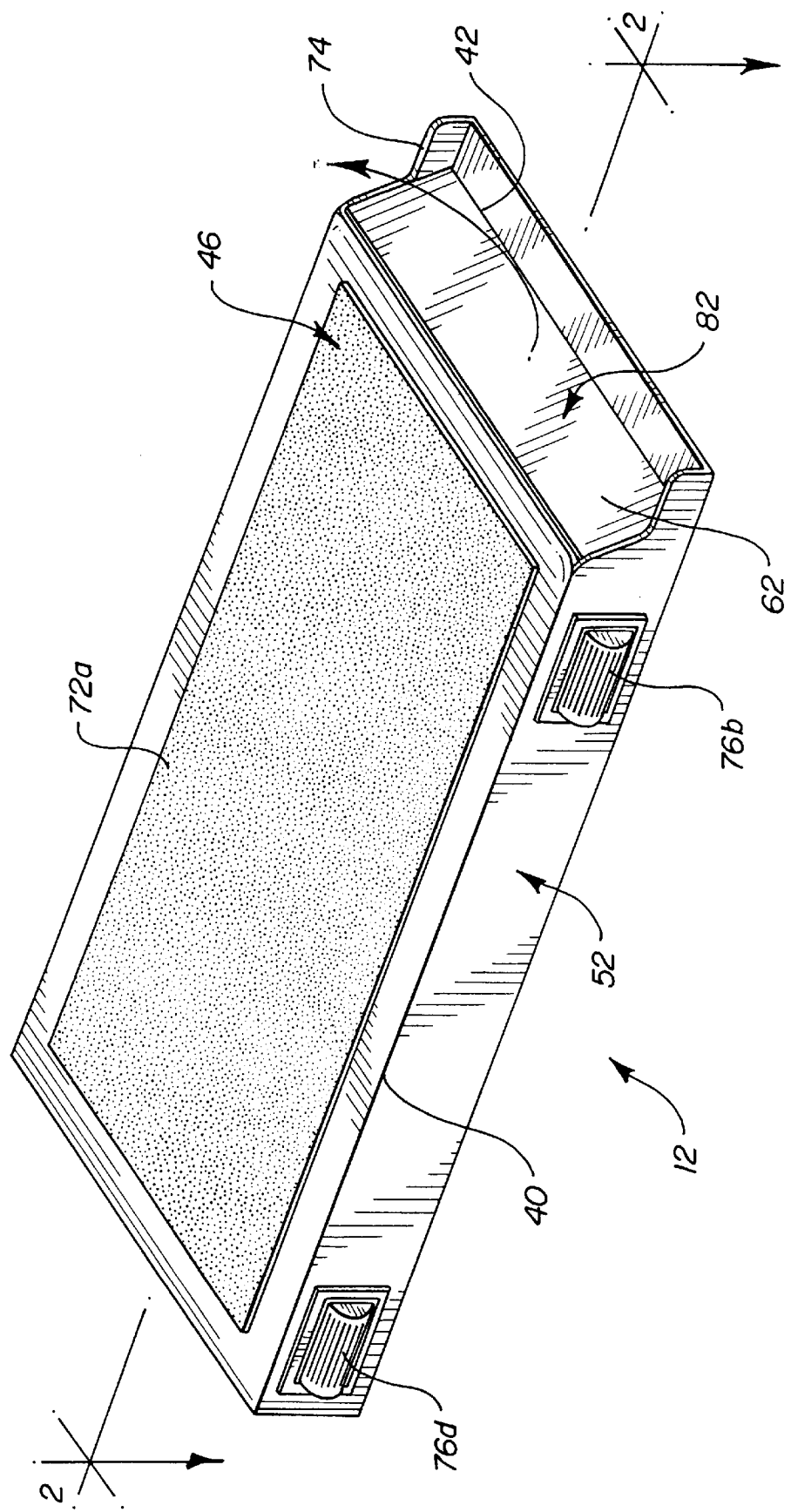
FIG. 1 is a perspective top view of an air distribution unit with a front flap in a closed position, in accordance with the features of the invention.
Figure 2:
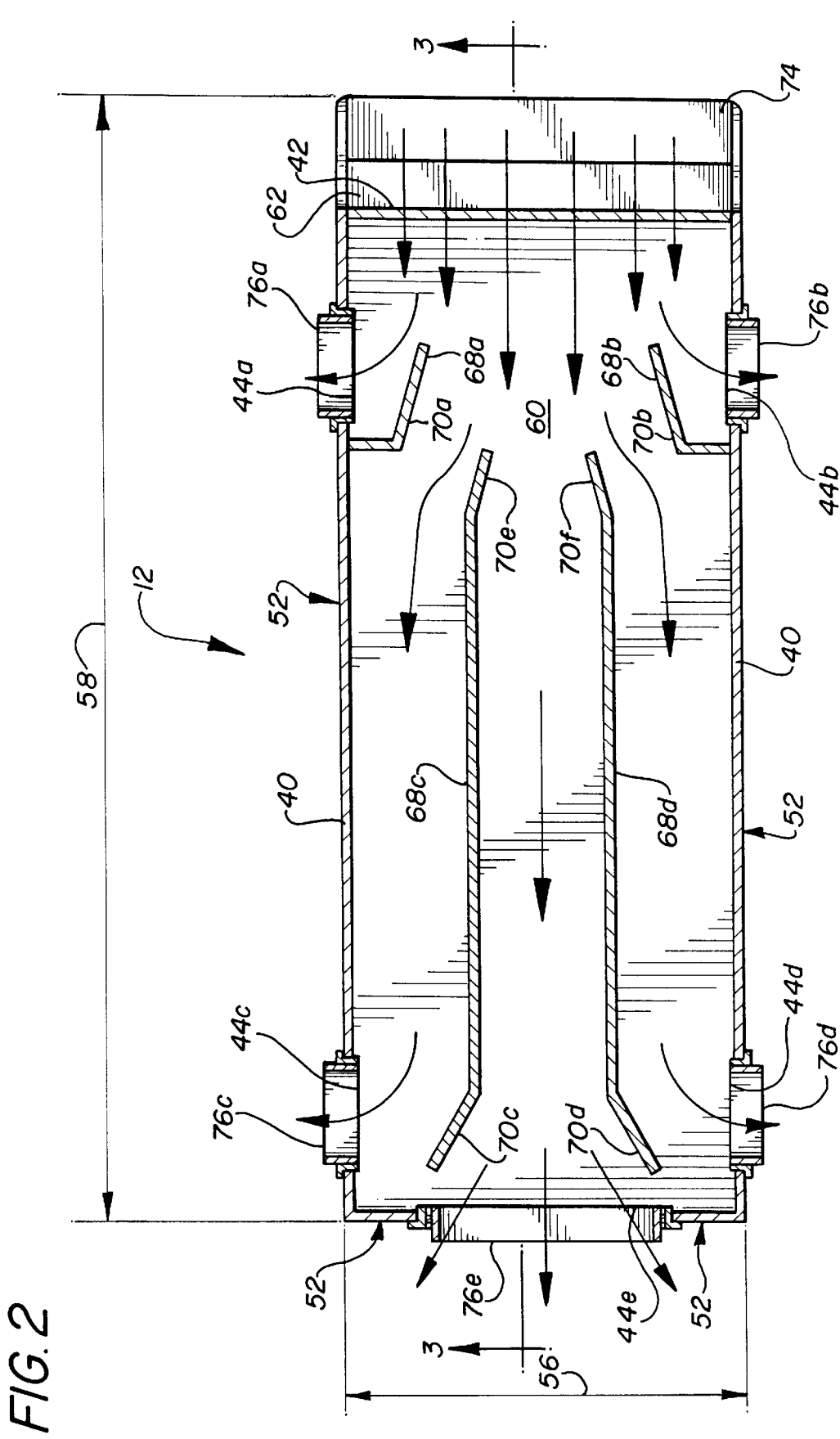
FIG. 2 is a top view of the air distribution unit of FIG. 1, here with the top portion cut-away and with the front flap in an open position.
Figure 3:
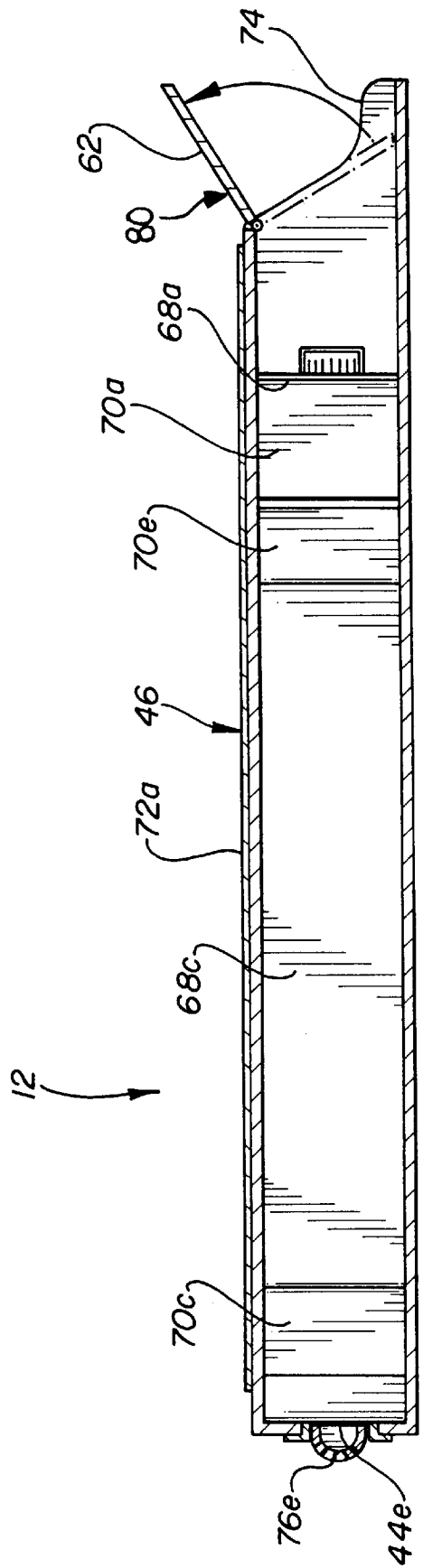
FIG. 3 is a partial cut-away side view of the air distribution unit in FIG. 2, taken along the line 3—3.

Referring now to the drawings, and in particular FIGS. 1 and 5, there is depicted an air distribution unit 12 for use in assisting in the distribution of a flow of air within a vehicle 14. The vehicle generally has longitudinally arranged front 16 and rear 18 ends and incorporates a floor 20. A front instrument panel 22 is located forwardly in the vehicle over the floor and an air treatment unit (not specifically shown) is fitted behind and/or under the instrument panel. The air treatment unit includes at least one air treatment outlet 28, preferably located adjacent the floor (as shown) or more distant from the floor as desired.

A front seat assembly 30 is located behind the air treatment outlet and mounted on the floor. A seat space is defined between passenger seat 36a and a second similar driver's side seat 36b (not shown) next to seat 36a (FIG. 5) of the front seat assembly. A rear seat assembly 38 is preferably located behind the front seat assembly. For example, captain-type seats may comprise the assembly 30 and a bench-type seat may comprise the assembly 38, similar to those seen in U.S. Pat. No. 4,512,239 of inventors Watanabe et al. which is incorporated by reference herein. In particular, excellent results are contemplated when the vehicle comprises a 1993 year Dodge model Caravan wherein an inner compartment 24 overlies the air treatment outlet 28.

The air distribution unit 12 is preferably portable and self-contained to enable simple installation, and installing in various types of vehicles, without modifying an existing air distribution system. Such a system (not shown in detail) comprises conventional vehicle air conditioning and/or heating components and a blower which together define the air treatment unit. The air treatment unit generally also includes a number of vents, or air treatment outlets, such as outlet 28 for example, to supply a uniform flow of treated air from the air treatment unit to the passenger compartment of the vehicle.

Referring to FIGS. 1–4, for example, the unit 12 comprises an elongate conduit 40 having an inlet 42 and at least one outlet, such as outlets 44a–e, located remote from the inlet. The conduit 40 further comprises a top portion 46 spaced from a bottom portion 48 and a side portion 52 joined therebetween. Although actual dimensions may be adjusted as desired, excellent results are contemplated for all vehicles when the conduit has a height 54 at most one-third a width 56 of the conduit, and further, the conduit is sized to engage the air treatment outlet and conduct the flow of treated air into, through and out of the air distribution unit while maintaining the uniform flow of treated air out of the air treatment outlet. In particular, when the vehicle is a 1993 Dodge model Caravan, preferably the height 54 of the conduit is about two and three-eighths inches, the width 56 is eleven and three-quarters inches and a length 58 is thirty-two and one-half inches.

The air distribution unit further comprises a chamber 60 within the conduit in airflow communication with the inlet and the at least one outlet. Preferably, the outlet has a smaller cross-sectional area than the chamber to assist in providing a regulated uniform flow of treated air out of more than one outlet, as desired. Also, preferably, a vent directional member is joined to the at least one outlet, such as members 76a–e. The vent directional member comprises a conventional vent structure that rotates within the outlet to direct air as desired and to increase or decrease the flow of air allowed out of the outlet.

For example, the directional members 76a–d can be omni-directional vent members that rotate up, down, side to side and any combination of directions in between, but they preferably only rotate up and down in a vertical direction as shown. Also, although exact dimensions can be varied, preferably a height of the vent member is less than or equal to a width of the vent member and the width equals about 1.3 times the height, but where a width and height of 2 inches can produce good results. The vent member 76e is preferably a vent that rotates only up and down in a vertical direction. As shown, excellent results are contemplated when each of the at least one outlet is located on the side portion 52 of the conduit. In this way, yet again as explained hereafter, utilization of the unit 12 can be fully achieved without modifying or interfering with the operation of the unit. Also, the vent members of the preferred construction can be adjusted with one's foot and the flow of air can be cut off completely at each vent member, as desired.

A front flap 62 is joined at least proximate the inlet 42, and preferably can be joined to the inlet along an upper edge as shown. The flap is moveable between an open position 80 and a retracted position 82 (e.g., FIG. 1). When the flap is in the open position air can flow into the inlet, through the chamber and exit the at least one outlet, thereby enabling the air distribution unit to assist in the distribution of air within the vehicle. It should be understood that the open position 80 (shown in one of many possible positions) comprises any number of positions in the range where some flow of treated air can flow into the chamber. Thus, the retracted position 82 comprises essentially only one position (as shown) where essentially no flow of treated air can flow into the chamber.

A front lip portion 74 is preferably joined to the bottom portion neighboring the inlet. The front lip portion protrudes beyond the front flap and has opposed vertical edges. The front lip portion can butt against and/or slide under the air treatment outlet to further assist in directing the flow of air into the chamber. In operation as part of the air distribution system of the vehicle, the flap, with and without the front lip portion, ensures that the inner compartment of the front instrument panel is at least partially accessible while maintaining at least some flow of treated air into and through the conduit. Further, this feature enables the unit 12 to be maintained in an operating position adjacent the air treatment outlet when the inner compartment is accessed.

Another feature of the invention relates to at least one support rib within the chamber, such as support ribs 68a–d. The support rib ensures a space 50 between the top and bottom portions, preferably maintaining a spaced parallel relationship across their surfaces between the top and bottom portions. The support rib may be located by any appropriate means, such as being connected to either the top portion or the bottom portion, but preferably is connected to both.

The support ribs 68a–d, in combination with durable and sturdy constructed top and bottom portions, enable the air distribution system to be load bearing to support, preferably, up to 350 pounds on the conduit. Such a feature is advantageous to enable ingress and egress between the seats of the front seat assembly without modifying operation of the air distribution unit, e.g, breaking the unit, undesirable stopping of the flow of air, having to temporarily move the unit as a whole, etc. That is, in particular, the unit 12 can support the weight of a human stepping thereon without any modification of the operation and/or position of the unit when in use.

A further feature concerns at least one flow control rib within the chamber, such as flow control ribs 70a–f. The flow control rib, and preferably one for each outlet 44a–e, directs the flow of air within the chamber to the outlet. The flow control rib and the support rib may be separate structures (e.g., support rib 68c compared to flow control ribs 70c and 70e) or they may be the same structure (e.g., support rib 68a and flow control rib 70a).

In operation, the unit 12 is preferably positioned adjacent the vehicle air treatment outlet 28, in air flow communication therewith, and comprises part of the vehicle air distribution system 10. The conduit is preferably maintained in this position by a frictional relationship between the bottom portion and the floor. That is, merely the unit's own weight causes the frictional relationship between the bottom portion and the floor to prevent the unit 12 from unintentionally moving once it is positioned as desired. In this regard, excellent results are contemplated when the bottom portion has an outer non-skid surface 72b for enhancing the frictional relationship between the bottom portion and the floor, or any adjacent contact surface for that matter. Also, as desired, the top portion may have an outer non-skid surface 72a for enhancing a frictional relationship between the top portion any adjacent contact surface.

As discussed hereinabove, and referring to FIG. 5, the unit 12 generally assists in distributing air within a vehicle and in particular assists in better distributing air to the rear passenger compartment of the vehicle while also maintaining a distribution of air within the front passenger compartment. To this end, it is preferred that the at least one outlet comprises at least two outlets where a first of the at least two outlets (e.g., outlets 44a and/or 44b) is positioned between the air treatment outlet 28 and the front seat assembly 30, and further, a second of the at least two outlets (e.g., outlets 44c, 44d and/or 44e) is positioned between the front seat assembly 30 and the rear seat assembly 38.

In similar regard, the conduit preferably has a length to extend through the seat space between the seats of the front seat assembly from the air treatment outlet to at least a back portion 32 of the front seat assembly. With these preferred features, the flow of treated air is conducted from the air treatment outlet to the front and rear seat assemblies whereby the unit extends far enough into the rear passenger compartment to conduct the flow of air but not so far as to interfere with the seating or leg space of the rear passenger compartment.

In another embodiment of the present invention, see FIG. 6 for example, the top portion has at least one cupholder, such as cupholders 78a and 78b. The cupholder extends into the chamber and the air flowing through the chamber regulates a temperature of the cupholder. By the ordinary laws of thermodynamics, air passing through the chamber and around the inside walls of the cup holder tends to warm the cupholder if the air is warm air and cool the cupholder if the air is cool air. Accordingly, if a cup (not shown) is sitting in the cupholder, through conductive heat exchange, the cup will tend to be warmed or cooled depending on the temperature differential between the cupholder, the cup and the flow of air through the chamber. In a similar way, the top portion of the conduit can be used to heat or cool an object placed thereon, for example heating a pair of ski boots on the way to the ski slope. In both example, the ordinary and intended operation of the unit 12 is not inhibited.

The air distribution unit 12 may be constructed from a variety of materials and in a variety of ways, as long as the desired features of the invention as hereinabove discussed are enabled. However, preferably the conduit, including the top, bottom and side portions, the inlet, the outlet(s), the flap, the lip portion, the support rib(s) and the flow control rib(s), comprises a unitary structure constructed of a material from the group consisting of metal, synthetic plastic and synthetic rubber. The vent directional members will preferably be constructed of a material from the group consisting of metal, synthetic plastic and synthetic rubber also. The vent directional member may be part of the unitary construction, however, it will likely be separate components to enable the rotational features as desired.

As various possible embodiments may be made in the above invention for use for different purposes and as various changes might be made in the embodiments above set forth, it is understood that all of the above matters here set forth or shown in the accompanying drawings are to be interpreted as illustrative and not in a limiting sense.

I claim:

1. A portable self-contained air distribution unit for use in assisting in the distribution of air within a vehicle, comprising:

an elongate conduit having an inlet, at least one outlet located remote from the inlet and a top portion spaced from a bottom portion;

a chamber within the elongate conduit in airflow communication with the inlet and the at least one outlet;

a front flap moveable between an open position and a retracted position, the front flap joined at least proximate the inlet of the conduit wherein when the front flap is in the open position air flows into the inlet through the chamber and exits the at least one outlet thereby enabling the air distribution unit to assist in the distribution of air within the vehicle.

2. The air distribution unit of claim 1, further comprising at least one support rib within the chamber wherein the support rib maintains a space between the top and bottom portions.

3. The air distribution unit of claim 2, further comprising at least one flow control rib within the chamber wherein the flow control rib directs the flow of air within the chamber to the at least one outlet.

4. The air distribution unit of claim 3, wherein the flow control rib and the support rib are separate structures.

5. The air distribution unit of claim 3, wherein the flow control rib and the support rib are the same structure.

6. The air distribution unit of claim 1, wherein a member from a group consisting of the top portion and the bottom portion has an outer non-skid surface for creating a frictional relationship between the outer non-skid surface and an adjacent contact surface.

7. The air distribution unit of claim 6, wherein the top portion and the bottom portion have the outer non-skid surface.

8. The air distribution unit of claim 1, further comprising a front lip portion joined to the bottom portion neighboring the inlet wherein the front lip portion protrudes beyond the front flap.

9. The air distribution unit of claim 1, further comprising a vent directional member joined to the at least one outlet.

10. The air distribution unit of claim 1, further comprising the top portion having at least one cupholder wherein the at least one cupholder extends into the chamber and wherein air flowing through the chamber regulates a temperature of the cupholder.

11. The air distribution unit of claim 1, wherein the conduit comprises a unitary structure constructed of a material from the group consisting of metal, synthetic plastic and synthetic rubber.

12. The air distribution unit of claim 1, wherein each of the at least one outlet is located on a side portion of the conduit.

13. An air distribution system in a vehicle, the vehicle having longitudinally arranged front and rear ends and incorporating a floor, a front instrument panel having an inner compartment, an air treatment unit fitted under the instrument panel which provides a uniform flow of treated air out of an air treatment outlet, a front seat assembly located behind the air treatment outlet and mounted on the floor forming a seat space defined between seats of the front seat assembly, and a rear seat assembly located behind the front seat assembly, the air distribution system including an air distribution unit comprising:

an elongate conduit having an inlet, at least one outlet and a top portion spaced from a bottom portion;

a chamber within the elongate conduit in airflow communication with the inlet and the at least one outlet;

at least one support rib within the chamber wherein the support rib is connected to at least one member from a group consisting of the top portion and the bottom portion; and, a front flap moveable between an open position and a retracted position, the front flap joined to the inlet of the conduit and wherein when the front flap is in the open position a flow of treated air flows into the inlet through the chamber and exits the at least one outlet.

14. The air distribution system of claim 13, wherein the elongate conduit is positioned adjacent the vehicle air treatment outlet and in air flow communication therewith and wherein the elongate conduit is maintained in position by a frictional relationship between the bottom portion and the floor.

15. The air distribution system of claim 14, wherein the inner compartment of the front instrument panel is at least partially accessible while maintaining the flow of treated air into and through the conduit and maintaining the position of the conduit adjacent the air treatment outlet.

16. The air distribution system of claim 14, wherein the elongate conduit is sized to engage the air treatment outlet and can conduct the uniform flow of treated air into, through and out of the air distribution unit while maintaining the uniform flow of treated air out of the air treatment outlet.

17. The air distribution system of claim 13, wherein the elongate conduit is load bearing to support up to 350 pounds on the elongate conduit thereby enabling ingress and egress between the seats of the front seat assembly without modifying operation of the air distribution unit.

18. The air distribution system of claim 13, wherein the elongate conduit has a height at most one-third a width of the elongate conduit.

19. The air distribution system of claim 13, wherein the at least one outlet comprises at least two outlets and wherein a first of the at least two outlets is positioned between the air treatment outlet and the front seat assembly and a second of the at least two outlets is positioned between the front seat assembly and the rear seat assembly.

20. The air distribution system of claim 19, further comprising the elongate conduit extending through the seat space between the seats of the front seat assembly and having a length extending from the air treatment outlet to at least a back portion of the front seat assembly wherein the flow of treated air is conducted from the air treatment outlet to the front and rear seat assemblies through the air distribution unit.

* * * * *